(12) United States Patent
Saito

(10) Patent No.: US 7,552,010 B2
(45) Date of Patent: Jun. 23, 2009

(54) CAR NAVIGATION SYSTEM

(75) Inventor: Katsumi Saito, Asaka (JP)

(73) Assignee: Fujifilm Corporation, Toyko (JP)

( * ) Notice: Subject to any disclaimer, the term of this patent is extended or adjusted under 35 U.S.C. 154(b) by 481 days.

(21) Appl. No.: 11/237,879

(22) Filed: Sep. 29, 2005

(65) Prior Publication Data

US 2006/0069502 A1 Mar. 30, 2006

(30) Foreign Application Priority Data

Sep. 30, 2004 (JP) .............................. 2004-285692

(51) Int. Cl.
*G06F 17/00* (2006.01)
(52) U.S. Cl. ........................................ 701/209; 700/17
(58) Field of Classification Search ......... 701/200–202, 701/207, 211, 213, 23, 25; 700/17, 83–84, 700/86–87; 340/988, 995.1, 995.23; 725/13, 725/19, 20, 37
See application file for complete search history.

(56) References Cited

U.S. PATENT DOCUMENTS

| | | | |
|---|---|---|---|
| 6,437,797 B1 | 8/2002 | Ota | |
| 6,657,661 B1 * | 12/2003 | Cazier | 348/231.2 |
| 6,995,792 B1 * | 2/2006 | Ogura | 348/231.99 |
| 7,096,211 B2 * | 8/2006 | Fujihara | 706/58 |
| 7,184,885 B2 * | 2/2007 | Watanabe | 701/201 |
| 7,245,306 B2 * | 7/2007 | Yoshio et al. | 345/591 |
| 2005/0104976 A1 * | 5/2005 | Currans | 348/231.5 |

FOREIGN PATENT DOCUMENTS

| | | |
|---|---|---|
| JP | 10-233985 A | 9/1998 |
| JP | 2001-349736 A | 12/2001 |

* cited by examiner

*Primary Examiner*—Dalena Tran
(74) *Attorney, Agent, or Firm*—Birch, Stewart, Kolasch & Birch, LLP

(57) ABSTRACT

The present invention provides a car navigation system and a car navigation device that can easily set a destination without complicated operation. The navigation device can load a memory card that records multiple image files taken by an image taking device with GPS function. All thumbnail image data in the header of the image file, which is recorded in the memory card loaded in the navigation device, is read to display a list of thumbnail images represented by the thumbnail image data. If any of the displayed thumbnail images is selected according to the operation of the cross key, GPS data corresponding to the selected thumbnail image is read to display a position represented by GPS data.

6 Claims, 8 Drawing Sheets

CAR NAVIGATION SYSTEM

BACKGROUND OF THE INVENTION

1. Field of the Invention

The present invention relates to a car navigation system having a car navigation device and an image taking device. The navigation device has GPS function that makes the device recognize its current position and displays, in response to setting of a destination, a map indicating the current position to guide a driver to the destination. The image taking device, upon image taking operation, records image data of a subject in a recording medium.

2. Description of the Related Art

Some of digital cameras are equipped with GPS (Global Positioning System) receiving device. When image taking operation is performed using such a digital camera, the GPS receiving device obtains information of the position where the image taking operation is conducted, so that the information is written in the header of the image file.

If a digital camera is equipped with GPS function, it can sort out image files by photo shooting locations.

Recently increasing number of cars have been equipped with a car navigation system which guides a driver to a destination. In many of the models using such a car navigation system, a driver is required to set the address of a destination. As input of the address is rather troublesome, there is presented a technique in which setting of a destination is made easy by operation of a portable remote terminal (see, for example, Japanese Patent Application Publication No. 2001-349736).

In the above technique, a GPS remote terminal incorporating a digital camera is used as a portable remote terminal. Original data representing a destination is created based on image data photographed using the digital camera, input information such as characters, and map data obtained through information exchange with the Map Information Service Center. The original data is transferred to the car navigation device to display on a map the route from a current position to the destination.

However, it is troublesome to transfer GPS data obtained by the portable remote terminal to the Map Information Service Center in order to obtain map data through information exchange with the Center.

SUMMARY OF THE INVENTION

The present invention has been made in view of the above circumstances, and provides a car navigation system and a car navigation device that can easily set a destination without complicated operation.

The present invention provides a car navigation system including:

a navigation device having GPS function that makes the device recognize a current position thereof and displays, in response to setting of a destination, a map indicating the current position to guide a driver to the destination; and an image taking device that, upon image taking operation, records image data of a subject in a recording medium, wherein the image taking device has GPS function that makes the device recognize a current position thereof and generates GPS data representing the current position, generates GPS data at the time of image taking operation and records the GPS data in the recording medium in association with the image data obtained by the image taking operation, the car navigation device further including:

a media drive detachably loaded with the recording medium where the GPS data is recorded in association with the image data, the media drive reading the GPS data and the image data from the recording medium;

a display control section that displays a list of thumbnail images based on the image data read by the media drive; and a destination setting section that sets a position as a destination, in response to selection of a certain thumbnail image from the displayed list of thumbnail images according to a predetermined operation, the position represented by the GPS data corresponding to the selected thumbnail image.

According to the car navigation system of the present invention, when the car navigation is loaded with a recording medium, which records image data taken by the image taking device with GPS function as well as GPS data representing the position where image taking is preformed, all image data in the recording medium is read by the media drive, and thumbnail images based on all the image data are displayed as a destination under control of the display control section. When any of the list of thumbnail images is selected, the destination setting section automatically sets in the car navigation system the destination represented by GPS data corresponding to the selected thumbnail image.

Consequently, there is no need of exchanging information with the Map Information Service Center to obtain map data, and destination setting only requires loading of a recording medium and selecting any of thumbnail images.

Preferably, the display control section displays thumbnail images in such a manner as to differentiate thumbnail images which already have been selected in the past as destinations from those unselected.

If already-selected thumbnail images are displayed differently from those unselected, a driver can instantly identify already-selected and unselected thumbnail images.

Further, the destination setting section may receive selection of plural thumbnail images and further may have a route searching section that searches for a route passing plural destinations corresponding to plural thumbnail images selected.

As the route searching section automatically searches for the route passing plural destinations, a driver does not need to ponder over how to get to plural destinations in a trip.

Preferably, the destination setting section makes a cursor displayed so as to overlap any of the list of thumbnail images, the cursor being able to move according to a predetermined operation, and the display control section displays a map, in response to the operation of overlapping the cursor with any of the list of thumbnail images, the map indicating a peripheral position represented by GPS data corresponding to the any of the list of thumbnail images.

As thumbnail images are reduced images, they are rather difficult to see. But, by displaying a map indicating a peripheral position corresponding to the thumbnail image, a driver can understand the position more clearly.

Further, the destination setting section may make a cursor displayed so as to overlap any of the list of thumbnail images, the cursor being able to move according to a predetermined operation, and the display control section displays a name of a position, in response to the operation of overlapping the cursor with any of the list of thumbnail images, the position represented by GPS data corresponding to the any of the list of thumbnail image.

It is possible to display a name of the position instead of or in combination of a map, by which a driver can confirm, for example, an address of the current position.

According to the present invention, the car navigation device, as an element of the car navigation system, having GPS function that makes the device recognize a current position thereof and displays, in response to setting of a destination, a map indicating the current position to guide a driver to the destination, the car navigation device including:

a media drive detachably loaded with the recording medium where GPS data is recorded in association with image data, the media drive reading the GPS data and the image data from the recording medium;

a display control section that displays a list of thumbnail images based on the image data read by the media drive; and a destination setting section that sets a position as a destination, in response to selection of a thumbnail image from the displayed list of thumbnail images according to a predetermined operation, the position represented by the GPS data corresponding to the selected thumbnail image.

As described above, it is possible to realize the car navigation system and device that can easily set a destination without complicated operation.

BRIEF DESCRIPTION OF THE DRAWINGS

The invention will now be described with reference to the accompanying figures of which.

DETAILED DESCRIPTION OF THE INVENTION

An embodiment of the present invention will be described below with reference to the drawings.

Figure 1:
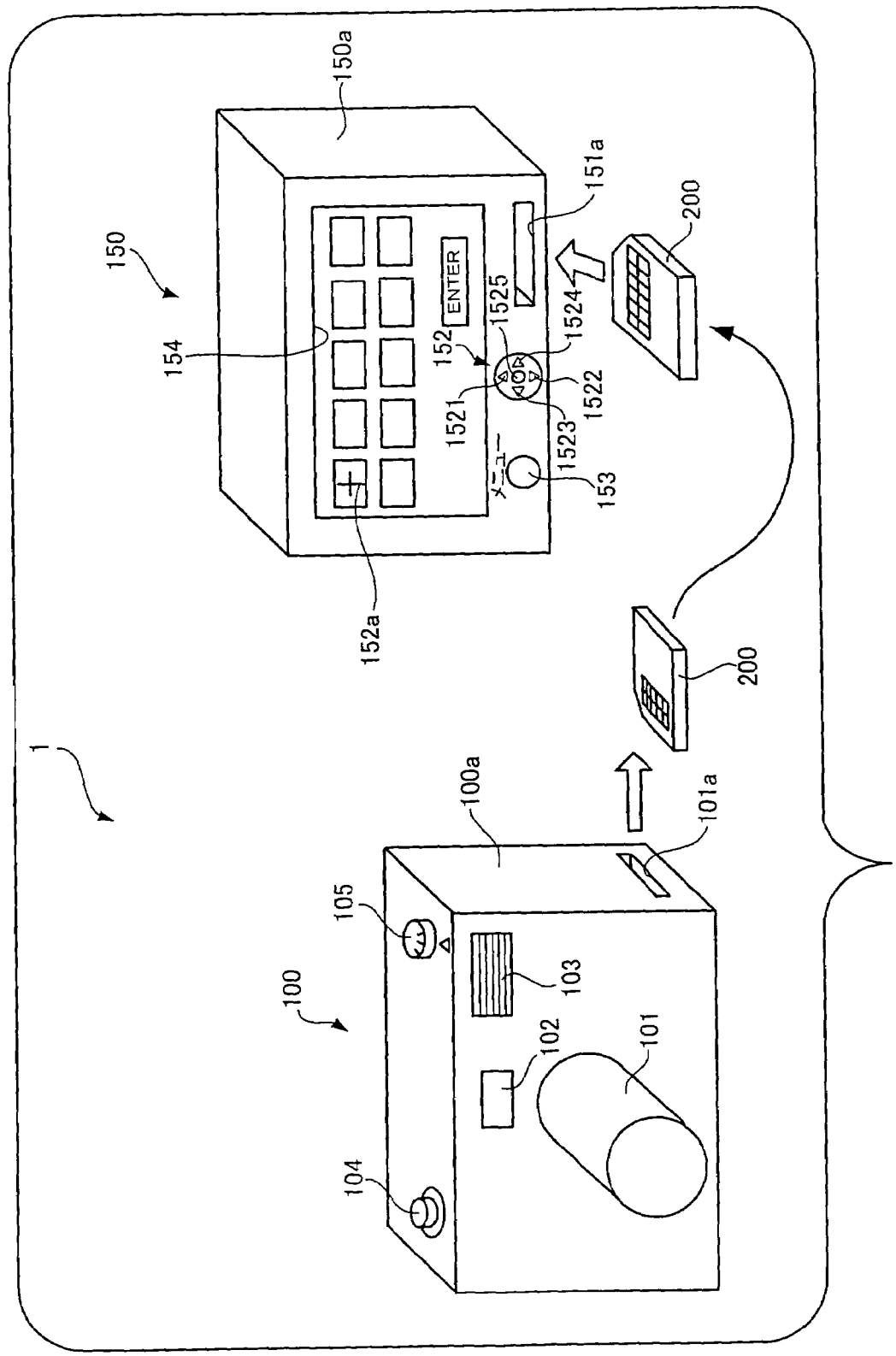
FIG. 1 shows a car navigation system composed of an image taking device and a car navigation device according to one embodiment of the present invention.

FIG. 1 shows a car navigation system 1 according to one embodiment of the present invention.

The car navigation system 1 is composed of a car navigation device 150 and an image taking device 100. The car navigation device 150 has GPS function to make it recognize its current position and displays, in response to setting of a destination, a map indicating the current position to guide a driver to the destination. The image taking device records an image data upon image taking operation in a recording medium.

The image taking device 100 has a lens barrel 101 with an image taking lens incorporated therein, a finder 102 and a flashlight-emitting widow 103. In the center of a camera body 100a, disposed is the lens barrel 101 above which the finder 102 and the flashlight-emitting widow 103 are provided. On the side of the camera body 100a disposed is a slot 101a for loading a memory card 200. With the memory card 200 loaded into the slot 101a, by pressing a release button 104 provided on the top of the camera body 100a, an image is taken and converted into an image file to be recorded in the memory card 200. The image file includes image data as well as a header which records information such as date of photo shooting and thumbnail image data, which is a reduced photographed image. The image file corresponds to what associates GPS data with image data according to the present invention. Multiple of the image files are recorded in the memory card 200.

The above photo shooting is performed when shooting mode is set by a mode dial 105 disposed on the top of the camera body 100a. When replay mode is set by the mode dial 105, the image based on the photographed image in the memory card 200 is displayed on a display screen (not shown) at the back of the camera body 100a.

Further, when GPS mode is set by an operation member (not shown) at the back of the camera body 100a after shooting mode is set by the mode dial 105, a GPS receiving device incorporated in the image taking device receives multiple electric waves from satellites to calculate the position where image taking operation is performed. Consequently, information for photo shooting location (hereafter referred to as GPS data) is added to the information in the header of the image file to be recorded in the memory card 200.

The car navigation device 150 is also provided with a storage compartment with a slit 151a, into which the memory card 200 is loaded. When the memory card 200 is loaded in the slit 151a, the information in the header of the image file recorded in the memory card 200 is read into the car navigation device 150. With the memory card 200 loaded through the slit 151a into the storage compartment, by operating a menu button 153 and selecting "destination setting" by a cross key 152, information in the header of all image files in the memory card 200 is read into the car navigation device 150 and a list of thumbnail images are displayed on a display screen 154 as shown in FIG. 1.

On the display screen 154 a cursor 152a is displayed which can be moved by using any of up key 1521, down key 1522, right key 1524 and left key 1523 of the cross key 152. When the cursor 152a moves to and overlaps any of the thumbnail images displayed on the screen, a driver presses OK button 1525 of the cross key 152, moves the cursor 152a to 'ENTER' and presses the OK button 1525 again. Then, destination setting is to be automatically completed in the car navigation device.

Figure 2:
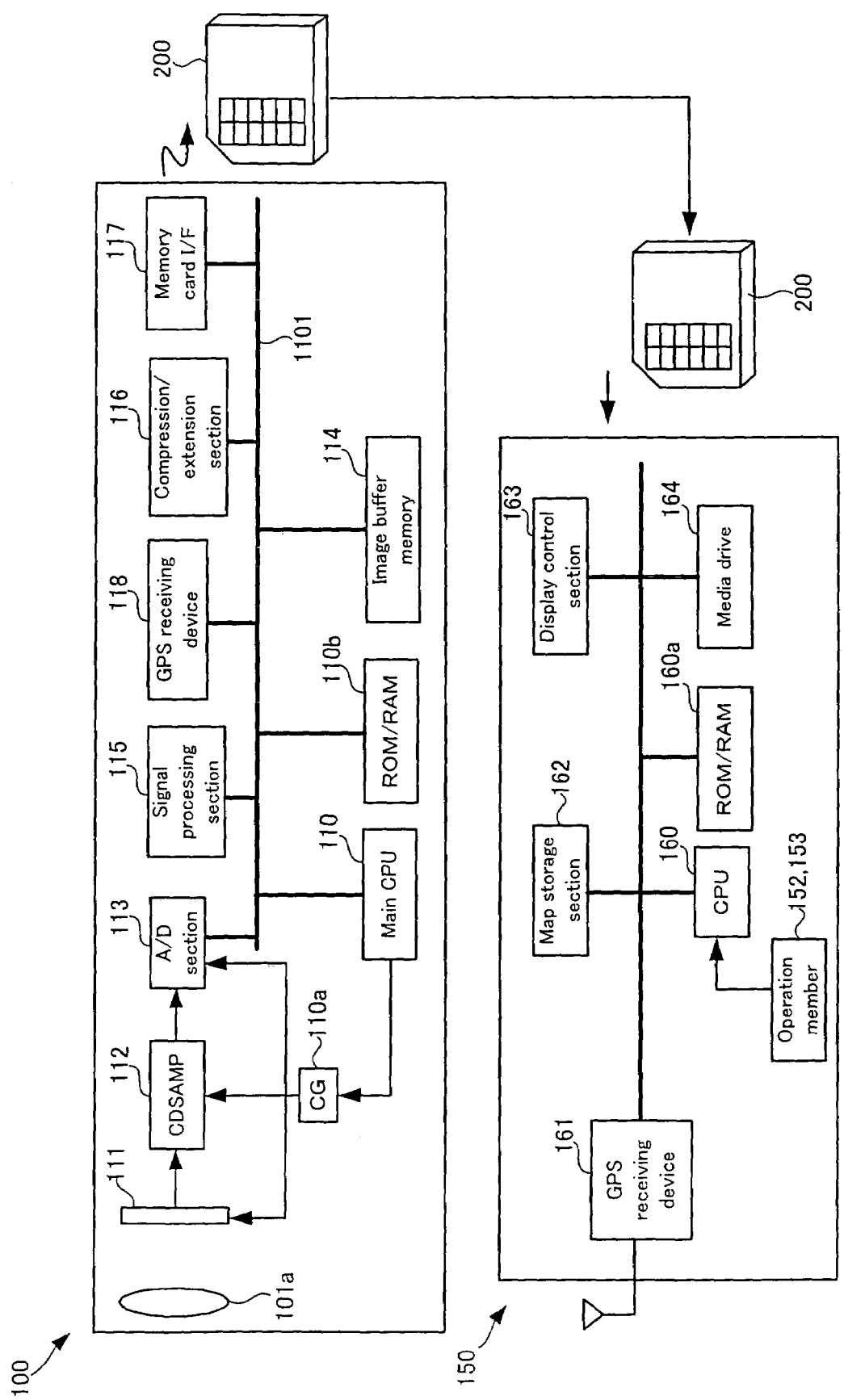
FIG. 2 shows a respective internal configuration of the image taking device and the car navigation device shown in FIG. 1.

Referring to FIG. 2, internal configuration of the image taking device 100 and the car navigation device 150 will be described.

FIG. 2 shows a respective internal configuration of the image taking device 100 and the car navigation device 150.

First, the internal configuration of the image taking device 100 will be briefly described.

The image taking device 100 has an image taking optical system 101a in which the image of a subject is formed on an imaging device 111. The imaging device 111 generates image data of analog signal representing the subject, which is output to subsequent CDSAMP 112. In A/D section 113, the image data of analog signal is converted into that of digital signal, which is once stored in image buffer memory 114 via data bus 1101.

Under control of main CPU 110, clock signal is supplied from a clock generator 110a (hereafter referred to as CG) to each section so that processing of analog signal of the image data in the imaging device 111, the CDSAMP 112 and the A/D section 113 can be performed in synch with each other. The image data of digital-converted signal is transferred to the signal processing section 115 and other sections via the data bus 1101 under control of the main CPU 110.

According to the embodiment, the image data of digital signal is once stored in the buffer memory 114 and then is supplied to the signal processing section 115 via the data bus 1101 under control of the main CPU 110, in which signal processing is applied to the image data. Then, controlled by the main CPU 110 the image data is supplied to the compression/extension section 116 where the image data is subjected to compression. The compressed image data is supplied to memory card I/F 117, which records the compressed image data in the memory card 200. At that time, header information such as photo shooting date and thumbnail image data is added to the image data to compose an image file, which is recorded in the memory card 200.

The image taking device 100 is provided with a GPS receiving device 118. Therefore, if any GPS data obtained by the GPS receiving device 118 is read into the main CPU 110, the GPS data is supplied to the memory card I/F 117 via the data bus 1101, which is written in the header as one of photo shooting information.

Next, the internal configuration of the car navigation device 150 will be briefly explained.

The car navigation device 150 is equipped with a GPS receiving device 161 and map storage section 162 so that a map can be displayed based on latitude and longitude information obtained by the GPS receiving device 161 controlled by display control section 163. According to the car navigation device 150 of the embodiment, the CPU 160 integrally controls operations of reading and writing from the GPS receiving device 161 and the map storage section 162 and instructions to the display control section 163 for displaying images on the screen. The CPU 160 receives operation signals from operation member such as the menu button 153 and five keys 1521 through 1525 of the cross key 152, so that it can control processing by the section corresponding to the operation signal from the operation member.

The car navigation device 150 according to the embodiment is also provided with media drive 164 to read header information in the image file recorded in the loaded memory card 200.

When "destination setting" is selected from options displayed on the display screen by operating the menu button 153, loading of the memory card through the slot 151a into the storage compartment is detected by the CPU 160 and the media drive 164 reads all header information in the image data of multiple image files recorded in the memory card 200. The read-out header information is further read into RAM 160a under control of the Main CPU 160. Consequently, thumbnail image data in the header is supplied to the display control section 163, so that it displays a list of thumbnail images based on the thumbnail image data on the display screen.

Setting of a destination is performed as follows. A driver selects any of the thumbnail images displayed on the screen as a destination by operating the cross key 152, and presses OK button 1525 of the cross key 152. Then the driver moves the cursor to 'ENTER' so as to overlap it and press the OK button 1525 again. In response to the setting of the destination, the CPU 160 supplies the display control section 153 with map data near the selected destination which is recorded in the map storage section 162 and causes the display control section 153 to display the map based on the map data as the destination.

Figure 3:
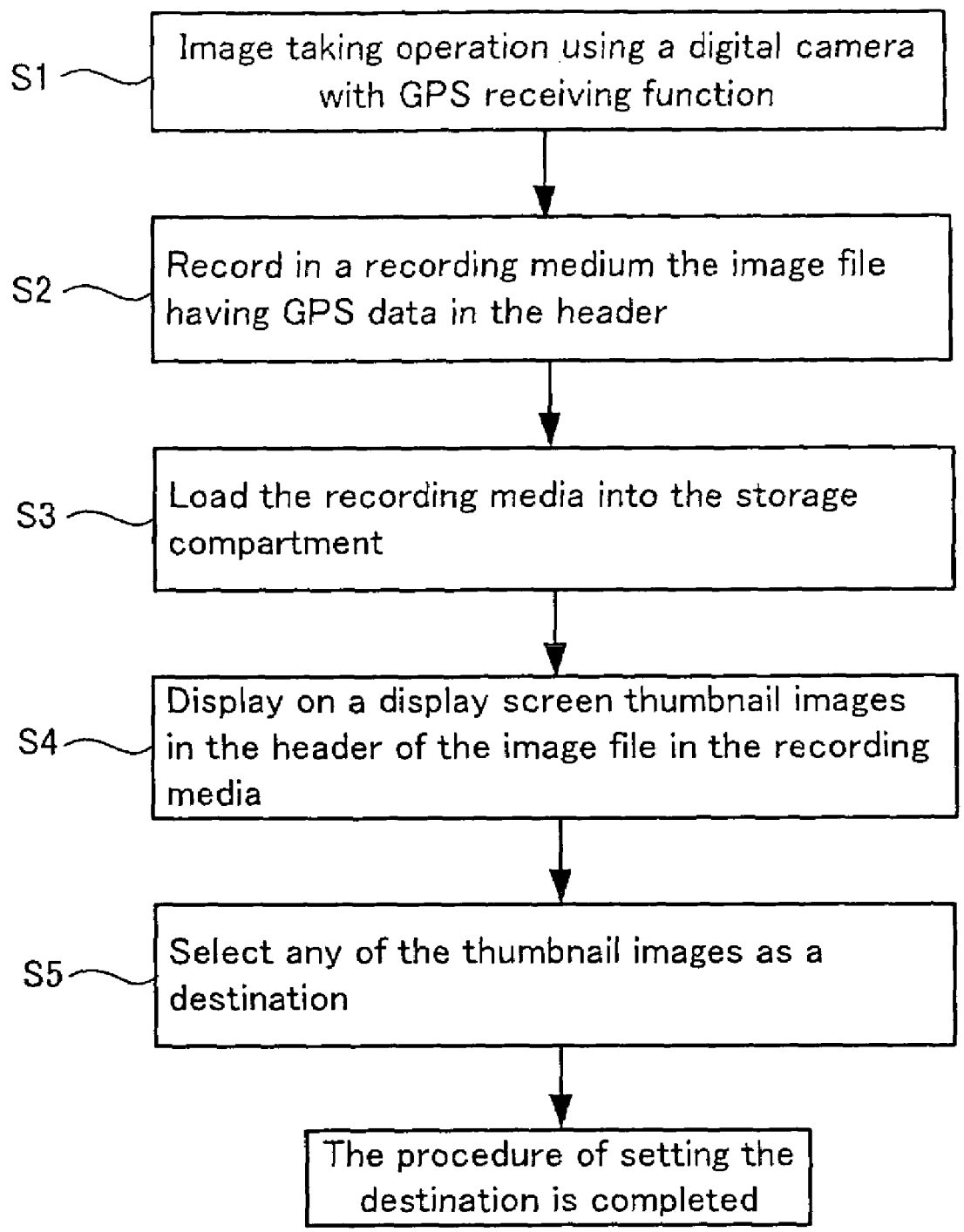
FIG. 3 is a flow chart showing destination setting procedures by the car navigation system.

FIG. 3 is a flow chart showing destination setting procedures by the car navigation system 1.

In step S1, an image taking operation is performed using the digital camera 100 with the GPS receiving function. In step S2, an image file having GPS data obtained by image taking operation in step S1 as header information is recorded in the memory card 200 (recording medium).

In step S3, the memory card 200 with multiple image files recorded therein is loaded into the car navigation device 150. In step S4, all of header information is read by the media drive 164 and is further read into RAM 160a which is a working memory of the CPU 160 (see FIG. 2). Out of the read-out header information, thumbnail image data is supplied to the display control section 163 to display a list of thumbnail images on the screen. In step S5, a driver selects any of the displayed thumbnail images as a destination. Then, the CPU 160 refers to relevant GPS data corresponding to the selected thumbnail image from the header of the image file to complete destination setting procedures. The CPU 160 corresponds to a destination setting section according to the present invention.

Figure 4:
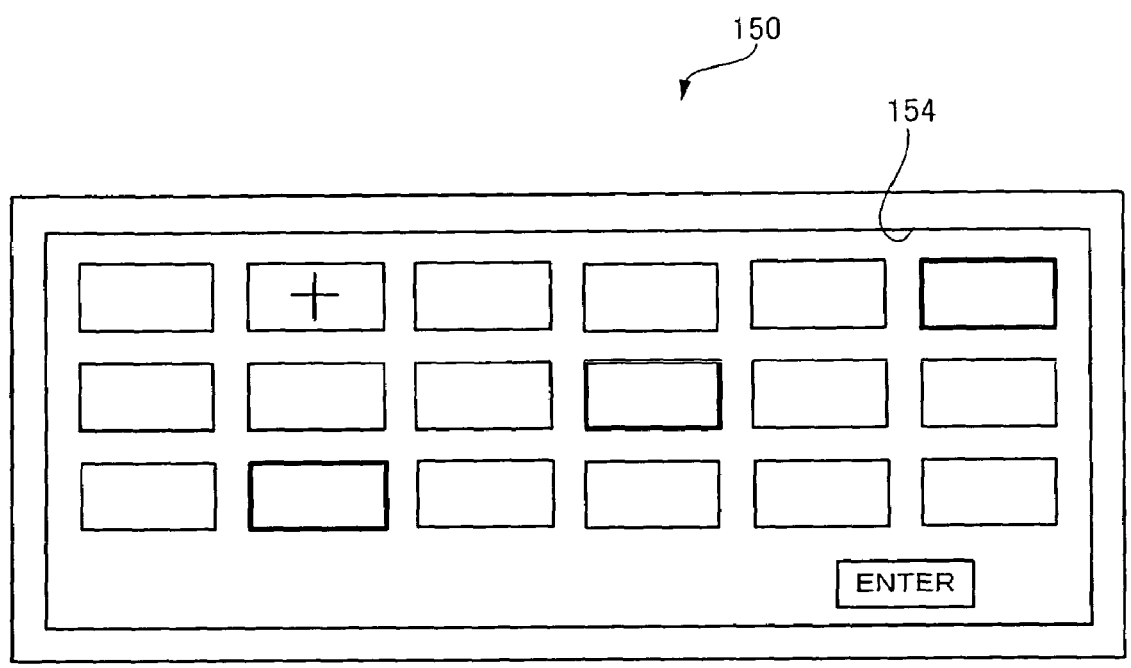
FIG. 4 shows a display screen displaying a list of thumbnail images.

FIG. 4 shows a display screen displaying a list of thumbnail images.

Setting of a destination is performed as follows. A driver moves the cursor 152a to any of the thumbnail images displayed on the screen so as to overlap it by operating the cross key 152, and presses OK button 1525 of the cross key 152. Then the driver moves the cursor to 'ENTER' so as to overlap it and presses the OK button 1525 again. Then, the CPU 160 which is the destination setting section sets the destination.

Consequently, destination setting can be made by simple operation, that is, moving the cursor to a certain thumbnail image and then pressing ENTER key so as to overlap it by operating the cross key 152.

In addition, according to the embodiment of the present invention, thumbnail images which already have been selected in the past as destinations are displayed in a frame marked with a bold line in order to differentiate it from those unselected.

If already-selected thumbnail images are displayed differently from those unselected, a driver can instantly identify already-selected and unselected thumbnail images.

Figure 5:
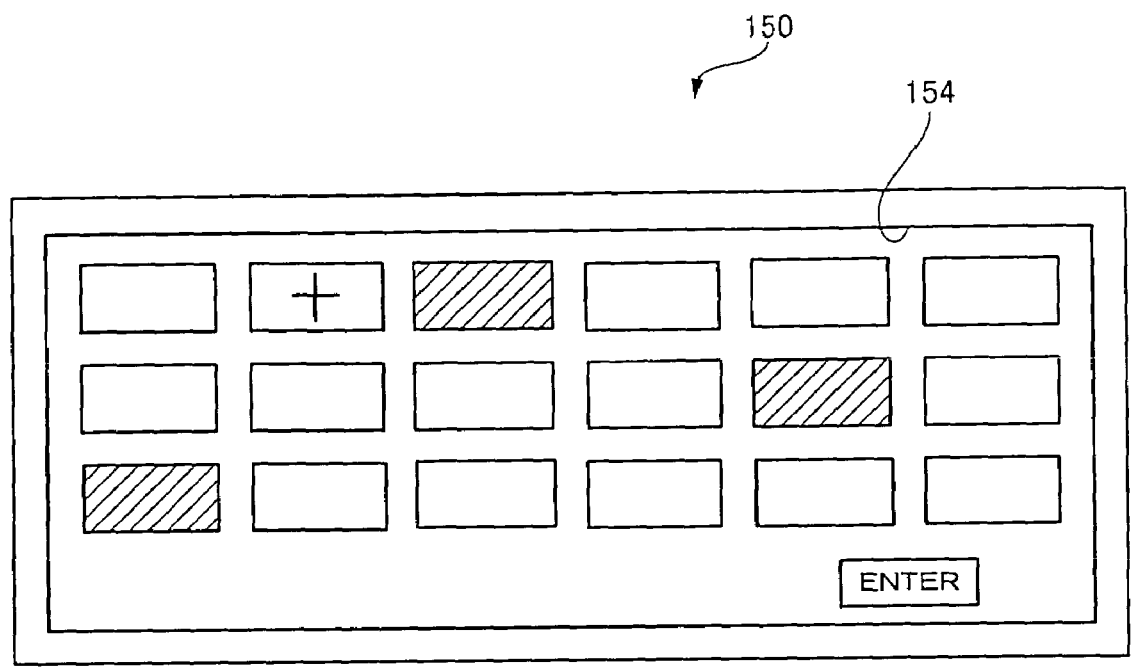
FIG. 5 shows a screen where plural destinations can be set.

FIG. 5 shows the screen where plural destinations can be set.

Plural destinations can be selected as follows. Move the cursor 152a to one of thumbnail images and then press the OK button 1525 of the cross key 152. Repeat this without moving the cursor 152a to 'ENTER' until desired destinations are selected. Then move the cursor 152a to 'ENTER' by operating cross key 152 and press the OK button 1525. Then, setting of plural destinations is completed.

According to the embodiment of the present invention, if the CPU 160 receives plural destinations as input information, it calculates the optimum route connecting the plural destinations and supplies the display control section 163 with the map data relevant to the optimum route which is read from the map storage section 162. The display control section 163 displays the map based on the map data on the display screen, thereby informing a driver of the optimum route.

Figure 6:
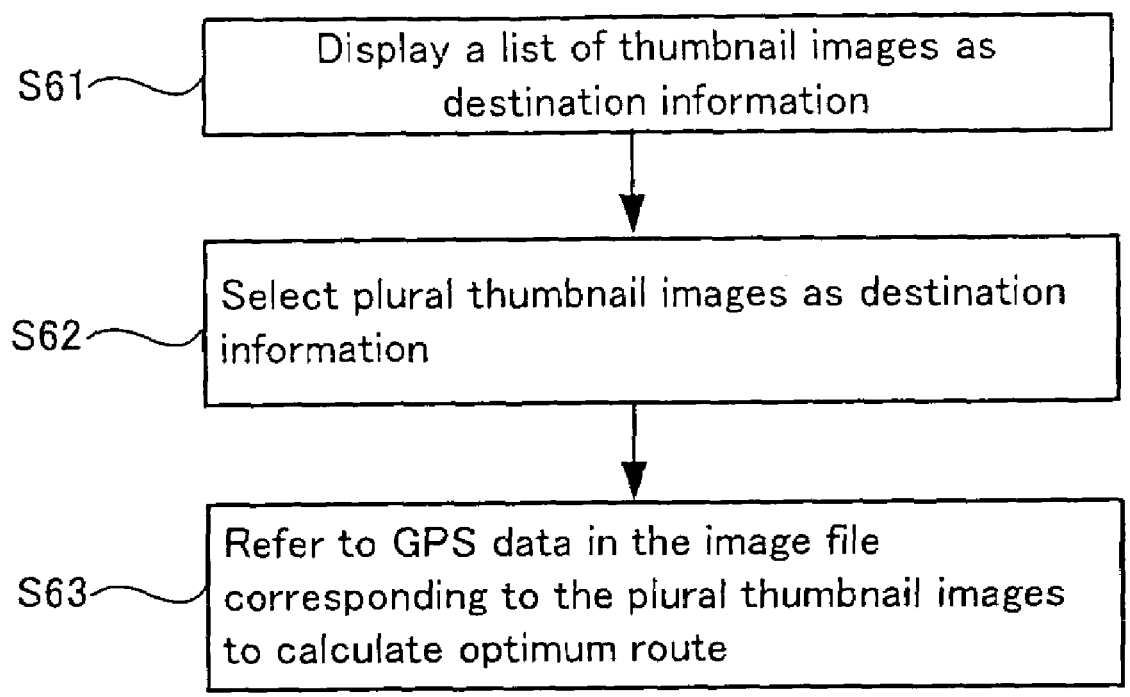
FIG. 6 shows procedures by a main CPU for setting plural destinations shown in FIG. 5.

FIG. 6 shows the procedures by the CPU 160 for setting plural destinations shown in FIG. 5.

In step S61, thumbnail image data is supplied to the display control section 163 so as to display thumbnail images corresponding to the data. In step S62, if plural thumbnail images are selected as shown in FIG. 5, the procedure goes to step S63, in which GPS data corresponding to the selected plural thumbnail images is referred to for calculating the optimum route.

According to the car navigation system of the embodiment of the present invention, a driver can set an itinerary in the car navigation device by selecting plural thumbnail images as the destination.

Figure 7:
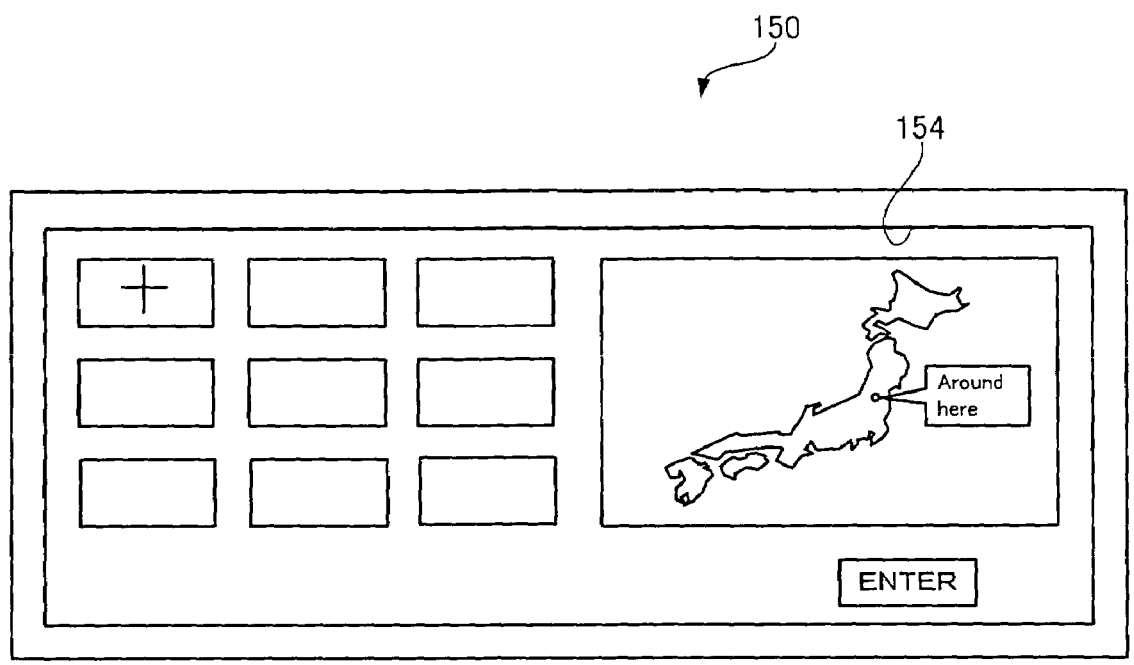
FIG. 7 shows a variation of the display screen shown in FIG. 4.

FIG. 7 shows a variation of the display screen shown in FIG. 4.

The CPU 160 as the destination setting section causes the display control section 163 to display the cursor which moves to and overlaps any of a list of thumbnail images displayed. In response to such operation of the cursor, the display control section 163 displays a map indicating the peripheral position represented by GPS data corresponding to the selected thumbnail images.

More particularly, the CPU 160 instructs the display control section 163 to display the cursor which moves to and overlaps any of a list of thumbnail images. Upon receiving coordinate data from the display control section 163, the CPU 160 interprets the position of the cursor and reads from the map storage section 162 the map data representing GPS data corresponding to the selected thumbnail image. The map data is supplied to the display control section 163 so as to display the map.

Given that thumbnail images which are reduced images are rather difficult to see, it is devised for better understanding of the destination by a driver to display a map indicating peripheral position represented by GPS data corresponding to the selected thumbnail image.

Figure 8:
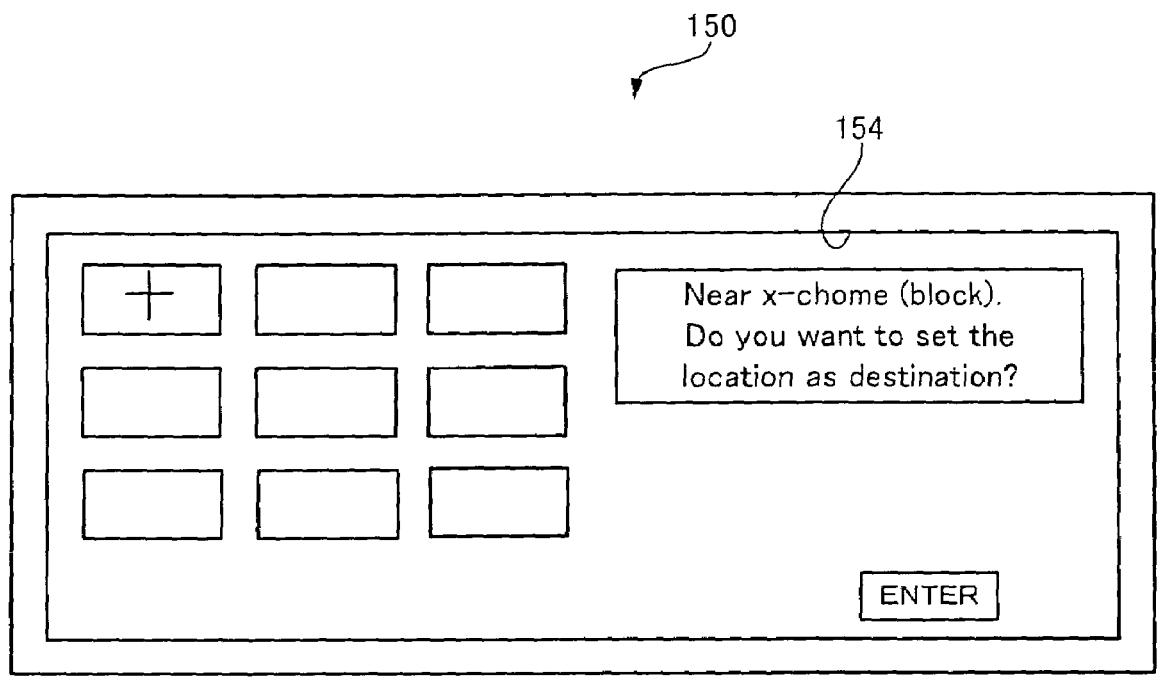
FIG. 8 is another variation of the display screen shown in FIG. 4.

FIG. 8 is another variation of the display screen shown in FIG. 4.

In FIG. 7, the CPU 160 as the destination setting section causes the display control section 163 to display the cursor and, in response to the operation of the cursor moving to and overlapping any of a list of thumbnail images displayed, the display control section 163 displays a map. However, as shown in FIG. 8, the name of the position represented by GPS data may be displayed instead of a map. By doing so, a driver can confirm the name of the position, for example, the address of the destination.

According to the embodiment of the present invention, destination setting is performed by operation of the cross key 152, in which the cursor 152*a* is moved and the OK button 1525 is pressed. However, it is also possible to perform destination setting by touch panel operation.

What is claimed is:

1. A car navigation system comprising:
   a car navigation device having GPS function that makes the device recognize a current position thereof and displays, in response to setting of a destination, a map indicating the current position to guide a driver to the destination; and
   an image taking device that, upon image taking operation, records image data of a subject in an image file in a recording medium, the image file including the image data and header information,
   wherein the image taking device has GPS function that makes the device recognize a current position thereof and generates GPS data representing the current position, generates GPS data at the time of image taking operation and records the GPS data in the header information of the image file at the time of recording the image file in the recording medium,
   the car navigation device further comprising:
   a media drive detachably loaded with the recording medium where the GPS data is recorded in association with the image data, the media drive reading the GPS data and the image data from the recording medium;
   a display control section that displays a list of thumbnail images based on the image data read by the media drive; and
   a destination setting section that sets a position as a destination, in response to selection of a certain thumbnail image from the displayed list of thumbnail images according to a predetermined operation, the position represented by the GPS data corresponding to the selected thumbnail image.

2. The car navigation system according to claim 1, wherein the display control section displays the list of thumbnail images in such a way that thumbnail images which have been already selected as destinations in the past are differentiated from those unselected.

3. The car navigation system according to claim 1, wherein the destination setting section is to receive selection of a plurality of thumbnail images,
   the destination setting section further comprising a route searching section that searches for a route passing a plurality of destinations corresponding to the plurality of thumbnail images selected.

4. The car navigation system according to claim 1, wherein the destination setting section makes a cursor displayed so as to overlap any of the list of thumbnail images, the cursor being able to move according to a predetermined operation, and
   the display control section displays a map, in response to the operation of overlapping the cursor with any of the list of thumbnail images, the map indicating a peripheral position represented by GPS data corresponding to the any of the list of thumbnail images.

5. The car navigation system according to claim 1, wherein the destination setting section makes a cursor displayed so as to overlap any of the list of thumbnail images, the cursor being able to move according to a predetermined operation, and
   the display control section displays a name of a position, in response to the operation of overlapping the cursor with any of the list of thumbnail images, the position represented by GPS data corresponding to the any of the list of thumbnail image.

6. A car navigation device having GPS function that makes the device recognize a current position thereof and displays, in response to setting of a destination, a map indicating the current position to guide a driver to the destination, the car navigation device comprising:
   a media drive detachably loaded with a recording medium, the recording medium including at least one image data file including the image data and header information, the header information containing GPS data representing a position of the image data file at the time the image data file is recorded to the recording medium, the media drive reading the GPS data and the image data from the recording medium;
   a display control section that displays a list of thumbnail images based on the image data read by the media drive; and
   a destination setting section that sets a position as a destination, in response to selection of a thumbnail image from the displayed list of thumbnail images according to a predetermined operation, the position represented by the GPS data corresponding to the selected thumbnail image.

* * * * *